United States Patent Office 3,291,428
Patented Dec. 13, 1966

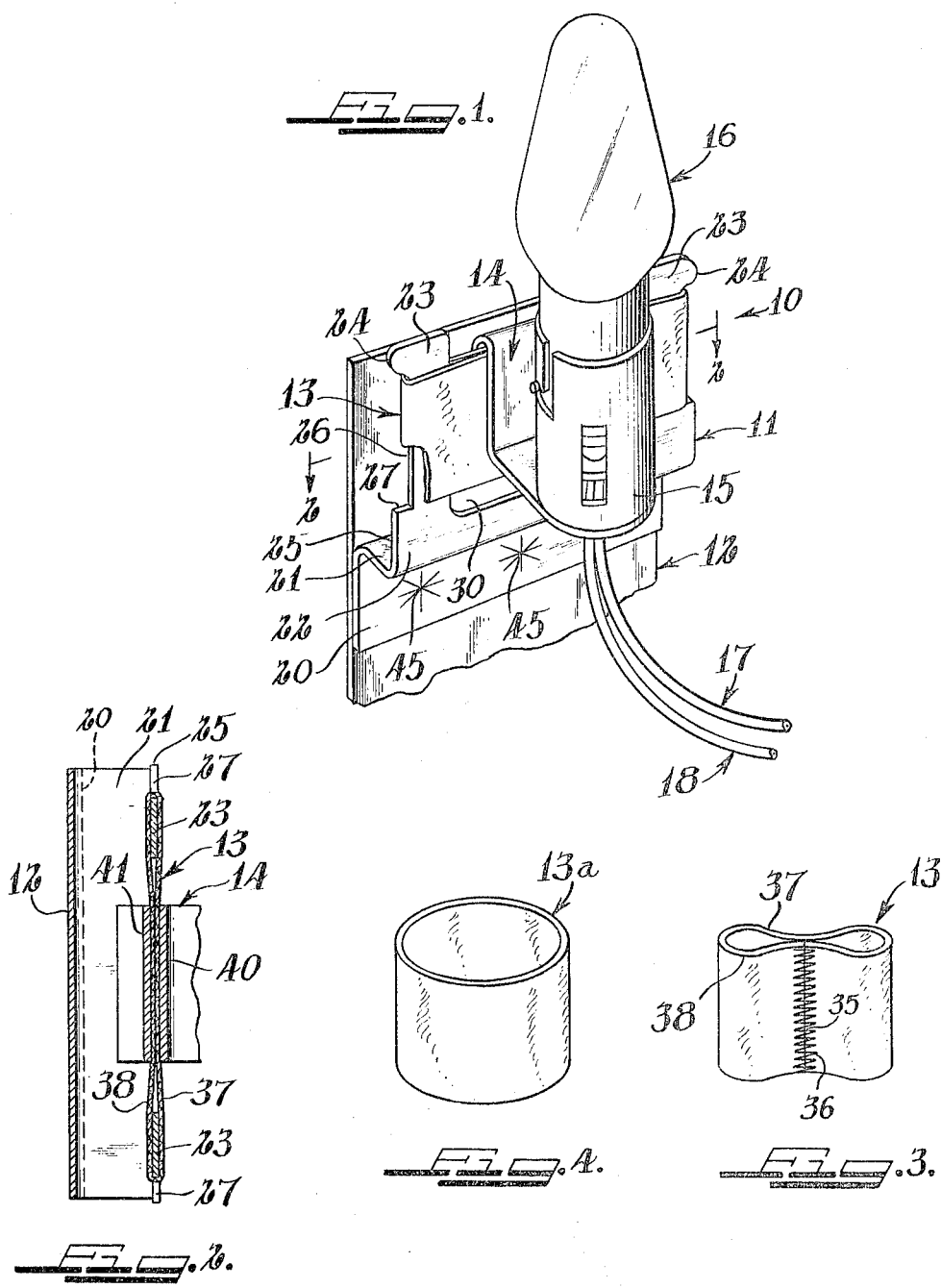

3,291,428
SHOCK MOUNT
Michael S. Sisulak, Chicago, Ill., assignor to Rock-Ola Manufacturing Corporation, Chicago, Ill., a corporation of Delaware
Filed Jan. 18, 1965, Ser. No. 426,146
4 Claims. (Cl. 248—204)

This invention relates generally to mounting structures and assemblies and more particularly to improvements in shock and vibrational resistant mounting means.

The present invention is especially useful in shock mounting incandescent lamps and similar delicate devices having recognizably high susceptibility to breakage in the presence of vibration.

The need for a simple reliable and economic shock mounting means for insulating delicate instruments and similar objects, has been long felt in various industries and arts. By way of illustration, incandescent lamps or light bulbs having delicate filaments are generally incapable of withstanding any sustained vibrational or shock forces yet their general use in innumerable industrial items, normally subjected to vibrational forces and shock, is widespread. The task of periodically replacing broken incandescent lamps which have failed by reason of vibration or jarring is a recognized economic waste consumming excessive man hours of labor and material both for the manufacturer and the user. While the makers of incandescent lamps have sought to make their product more rugged and capable of withstanding rough handling, the inherent nature of the incandescent filament substantially defies this effort. The same observation is equally true in other areas of manufacture, such as delicate measuring instruments for example, which inherently embody elements and parts that are generally incapable of withstanding shock and vibration. As a consequence, for considerable time there has been a concerted effort to develop a suitable means for relatively insulating delicate devices and instruments, typified by the incandescent bulb, from shock and vibration. However, such past efforts generally have gone unrewarded principally because the economic cost of adequately protecting such items from shock and vibration has, as a rule, proven to be excessive. In many instances, for example, the cost of shock mounting such items has proven greater than the value or cost of the item being protected. This is pointedly illustrated in the case of the incandescent bulb. Consequently the need for a simple, efficient, dependable and economic means for insulating items, such as incandescent lamps, from shock and vibration remains a vexatious problem throughout industry and is generally tolerated by both manufacturer and user as an aggravating, but necessary by-product of our modern day society.

The present invention is not only simple in structure and economic in manufacture and application, but is remarkably dependable in operation and is therefore belived to provide a unique and inventive solution to this long outstanding problem. In brief the present invention comprises a simplified mounting frame capable of being attached to any suitable support means. The frame is formed to provide means for mounting a yieldable mounting means so that an associated portion thereof is in spacial suspension. Preferably the mounting means comprises an endless elastic loop or band attached to and extending between spaced arm portions of the mounting frame, but otherwise being free of any connection with the frame and support. In this fashion a spacially suspended, yieldable, shock resistant and dampening platform is provided to which a suitable holding device associated with items to be shock protected may be attached. In the case of an incandescent lamp or the like, such holding devices conveniently may take the form of spring clip means having a lamp receiptive socket associated therewith. By this arrangement the lamp is suspended on the elastomer shock absorbing means, substantially free from direct transmission of vibration or shock forces imposed on the support structure to which the mounting means of this invention is attached.

One object of this invention is to provide a new and improved shock mounting means, particularly useful for insulating delicate objects from shock and vibrational forces.

Another important object of this invention is to provide a new and improved shock mounting means which is simple and economical to manufacture, convenient to install and dependable in use and operation.

A still further important object of this invention is to provide a new and improved shock mounting means, as aforesaid, to which various items to be protected from shock and vibrational forces may be quickly and simply attached and detached.

An additional object of this invention is to provide a new and improved means for shock mounting incandescent lamps and like items.

Still another object of this invention is to provide a new and improved shock mounting means embodying an elastic member tensioned between spaced supports and which provides a shock absorbing platform receptive of objects to be insulated from shock and vibration.

Having thus described this invention the best mode presently contemplated for enabling those skilled in the art to make and use the same shall now be set forth in conjunction with the following description of a preferred embodiment thereof, illustrated in the accompanying drawings:

In the drawings:

FIG. 1 is a perspective view of an improved shock mounting means according to this invention, illustrating its adaptation and use with incandescent lamps;

FIG. 2 is a cross-sectional view taken substantially at line 2—2 of FIG. 1 and looking at the direction of the arrows thereon;

FIG. 3 is a perspective view of the elastic mounting means employed in the assembly of FIG. 1; and FIG. 4 is a perspective view showing a modified form of elastic mounting means according to this invention.

Turning now to the particulars of the embodiment of this invention, illustrated in the accompanying drawings, it will be recognized from FIG. 1 especially, that the improved shock mount, indicated generally at 10 thereat and constructed according to this invention comprises a unitary mounting frame 11, adapted to be attached to a rigid support 12, the frame having means supporting and tensioning mounting means 13 thereon to provide a resilient shock resistant platform to which a holding device 14 is readily attached. In the particular illustrated embodiment the holding device 14 carries a cylindrical lamp socket 15 receptive of an incandescent lamp or bulb 16 supplied by electrical conductors 17 and 18.

Specifically, the mounting frame 11, as illustrated, is preferably formed as a unitary metal stamping, or the like, having a planar base portion 20 of substantially rectangular formation, bent outwardly at substantially right angles along one lateral margin thereof, to provide an integral offsetting leg portion 21, which in turn merges with a planar mounting section 22. The mounting section 22 is particularly distinguished by a pair of laterally spaced coplanar, cantilever arm portions 23—23 having a plane of formation which generally parallels the plane of the frame's base portion 20.

It is to be noted that each of the arm portions 23—23 has an extending ear 24 adjacent the outer corner thereof;

the lateral extent of the two ears 24 being substantially equal to the lateral extent of the mounting section 22, or that is, each ear is substantially aligned with a lateral edge 25 of section 22. Each of the arm portions 23 is further formed in such fashion as to provide an outer lateral edge 26 set inwardly from the platform edge 25; wtih the two edges 26 and 25 being coplanar and interjoined by a short stop-shoulder portion 27 for reasons which will appear presently.

From the foregoing it will be recognized that the relationship of the spaced arm portions 23—23 and the mounting section 22 of the frame 11 produce a substantially U-shaped configuration in which the arm portions 23—23 comprise upstanding or free arms of the U and section 22 the base leg thereof. With this formation an enlarged opening 30, bounded on three sides by the arm portions 23—23 and the base leg section 22, is provided across which extends the elastic mounting means 13 comprising a shock resistant member according to this invention.

As best illustrated in FIGS. 1 through 3 of the drawings, mounting means 13 constitutes an endless loop or belt preferably made of elasticised fabric, similar to that employed in garters or elastic undergarments, although other materials of an elastic nature also may be used for this element of the combination. One form of means 13 may be as illustrated in FIG. 3 wherein the same comprises an endless loop belt having a figure eight cross section formulated from a linear length of elastic material or the like, having the opposing or opposite ends thereof abutted at seam 35 and interjoined by cross stitching 36 which connectively extends through and between the two opposing runs 37 and 38 of the belt or loop.

As an alternate equivalent construction, the modified means 13a, illustrated in FIG. 4 of the drawings, may be employed instead of mounting member 13. Modified member 13a constitutes a simple uninterrupted endless belt formed from an axial section of elastic tubing, again preferably made of an elastized fabric, rubber or like material.

In assembly, the elastic mounting means 13 or 13a as the case may be, is stretched tightly across the opening 30 between the separated cantilever arm portions 23, 23 of frame 11, as shown best in FIGS. 1 and 2 of the drawings. That is to say, when employing the stitched loop member 13 of FIG. 3 each of the arm portions 23, 23 is extended through one of the end loops of its figure eight structure, the spring between arm portions 23, 23 being greater than the diameter of the loop or belt so as to tension the latter across the frame opening 30. When so mounted the ear portions 24 of the arm portions 23 and the shoulder portions 27 cooperatively serve to keep the elastic mounting member 13 from shifting axially and disengaging from frame 11. It also will be noted that in its mounted position on frame 11, the resilient mounting means 13 or 13a, as the case may be, provides a central resilient platform or support portion freely suspended in space intermediate the arm portion 23, 23; such platform being formed by the opposing layer 37, 38 of the belt tensioned tautly across the opening 30.

As shown best in FIG. 1 of the drawings, the resilient platform provided by the elastic mounting means as above described, is adapted readily to mount suitable holding devices, such as the spring clip means 14 having yieldably separable opposing finger portions 40 and 41 (see FIG. 2). Fingers 40 and 41 are normally resiliently biased into contacting engagement with one another to resiliently grip opposing faces of the mounting platform provided by means 13 when attached thereto. Thus the clip member is resiliently coupled to the means 13 of the improved mounting means of this invention out of contact with the frame 11 and consequently substantially insulated from any shock and vibration transmitted to such frame from the associated support means 12 to which frame 11 is attached as by spot welds 45 or the like.

From the foregoing it will be understood and recognized that with the holding device 14 attached to the resilient platform of the mounting means 13, as described, a lamp 16 mounted in socket 15 will be resiliently mounted and comparatively isolated from shock and vibration imposed on support 12 on frame 11. Thus the objective of this invention to provide a simple and economical shock mounting means is accomplished. Further, because of the simple clip-on characteristic of the holding device 14, the same readily and easily may be detached from the resilient platform of mounting means 13, as required.

It is believed that those familiar with the art will readily understand and appreciate the merit and novel advancement of the present invention over previous developments in this field. Further, it will be readily recognized and understood that while the present invention has been herein described in association with a particular embodiment illustrated in the accompanying drawings, the same is nevertheless susceptible to numerous changes, modifications and substitutions of equivalents without necessarily departing from the spirit and scope thereof. Consequently, it is intended that the present invention be unlimited by the foregoing description except as may appear in the following appended claims.

I claim:

1. Shock mounting means comprising, a mounting frame having a portion adapted to be fixedly attached to support means, spaced coplanar arm means formed on said frame and separated by an open space therebetween, and unitary elastic mounting means connected to and extending between said arm means and comprising an endless band of elastic material providing a resilient planar shock absorbing platform suspended in said space between and substantially coplanar with said arm means whereby items to be shock protected may be attached to said platform and substantially insulated from shock and vibrational forces imposed on said frame.

2. In combination, mounting frame means having a portion for attaching the same to a support normally subjected to vibration and shock forces, cantilever arm portions formed on said frame, said arm portions being separated by a spacial opening, and unitary elastic mounting means attached to and tensioned between said arm portions and forming a substantially planar yieldable platform portion located in said spacial opening to which items to be shock protected may be attached, said elastic mounting means comprising an endless elastic band fitted over said arm portions, and said platform portions being formed by opposed runs of said band.

3. Improved shock mounting means comprising mounting frame means having a portion adapted to be connected to a support normally subjected to vibrations and shock, a substantially U-shaped section formed on said frame in spaced relation with said support and comprising a pair of laterally spaced cantilever arm portions, yieldable means comprising an endless elastic band mounted over said arm portions and extending across the space therebetween; said yieldable means being tensioned by said spaced arm portions and providing a substantially planar, resilient, shock absorbing platform suspended between said arm portions; and means for attaching items to be shock protected to said platform.

4. The combination set forth in claim 3 including means on each of said arm portions for holding said yieldable means in predetermined position thereon.

References Cited by the Examiner

UNITED STATES PATENTS

| | | | |
|---|---|---|---|
| 830,010 | 9/1906 | Sanders | 248—204 X |
| 1,401,121 | 12/1921 | Allen | 248—358 X |
| 1,644,287 | 10/1927 | Spencer | 240—52 |
| 3,074,681 | 1/1963 | Kerley | 248—358 |
| 3,204,913 | 9/1965 | Lawrence et al. | 248—358 |

CLAUDE A. LE ROY, *Primary Examiner.*

J. PETO, *Examiner.*